(12) United States Patent
Zolfonoon et al.

(10) Patent No.: US 8,601,531 B1
(45) Date of Patent: Dec. 3, 2013

(54) SYSTEM AUTHORIZATION BASED UPON CONTENT SENSITIVITY

(75) Inventors: Riaz Zolfonoon, Marlborough, MA (US); Gareth Richards, Woodstock (GB)

(73) Assignee: EMC Corporation, Hopkinton, MA (US)

( * ) Notice: Subject to any disclaimer, the term of this patent is extended or adjusted under 35 U.S.C. 154(b) by 387 days.

(21) Appl. No.: 12/493,541

(22) Filed: Jun. 29, 2009

(51) Int. Cl.
*G06F 7/04* (2006.01)

(52) U.S. Cl.
USPC ............. 726/1; 726/2; 726/3; 726/4; 713/182

(58) Field of Classification Search
USPC .......................................... 726/1–4; 713/182
See application file for complete search history.

(56) References Cited

U.S. PATENT DOCUMENTS

| | | | |
|---|---|---|---|
| 6,289,462 B1* | 9/2001 | McNabb et al. | 726/21 |
| 7,194,761 B1* | 3/2007 | Champagne | 726/6 |
| 7,275,260 B2* | 9/2007 | de Jong et al. | 726/10 |
| 7,516,492 B1 | 4/2009 | Nisbet et al. | |
| 7,774,363 B2* | 8/2010 | Lim | 707/781 |
| 8,141,160 B2* | 3/2012 | Anderson et al. | 726/26 |
| 8,407,194 B1* | 3/2013 | Chaput et al. | 707/694 |
| 2005/0044409 A1* | 2/2005 | Betz et al. | 713/201 |
| 2005/0080720 A1* | 4/2005 | Betz et al. | 705/38 |
| 2006/0136985 A1* | 6/2006 | Ashley et al. | 726/1 |
| 2006/0253445 A1* | 11/2006 | Huang et al. | 707/9 |
| 2007/0006325 A1* | 1/2007 | Gargaro | 726/27 |
| 2007/0240230 A1* | 10/2007 | O'Connell et al. | 726/28 |
| 2009/0106815 A1* | 4/2009 | Brodie et al. | 726/1 |
| 2010/0146593 A1* | 6/2010 | Stahl et al. | 726/4 |
| 2010/0235877 A1* | 9/2010 | Hu et al. | 726/1 |

* cited by examiner

*Primary Examiner* — Yin-Chen Shaw
(74) *Attorney, Agent, or Firm* — BainwoodHuang (57) ABSTRACT

An authorization device is configured to authorize access to a resource. The authorization device receives an authorization request to authorize a client device to perform an operation on the resource associated with a data system and compare an access characteristic associated with the resource with a policy associated with the resource. The authorization device generates a first message when a result of the comparison indicates that the client device is authorized to perform the operation on the resource and generates a second message when a result of the comparison indicates that the client device is unauthorized to perform the operation on the resource.

15 Claims, 4 Drawing Sheets

SYSTEM AUTHORIZATION BASED UPON CONTENT SENSITIVITY

BACKGROUND

A typical corporate organization employs the Internet to communicate with customers and vendors, to conduct research, and to perform various other tasks. The organization also creates and maintains confidential and sensitive information, such as financial data, personal information, confidential documents, intellectual property, and customer lists, as part of the usual course of business. Theft of proprietary information is one of the most costly security problems facing organizations today. For example, theft of financial data, customer lists and intellectual property can impact revenues, increase legal costs, and erode long-term competitive advantages.

To minimize access to proprietary information associated with an organization's data storage system, organizations typically utilize authorization systems. Authorization systems utilize predefined policies to determine if a user is allowed to carry out a given operation on a particular resource associated with the data storage system. For example, during operation, when a conventional authorization system receives a resource request from the user, the authorization system compares a user identification or privilege level associated with the request with the preconfigured policy. Based upon the results of the comparison, the authorization system can either allow or deny the user's request to access the resource based upon the associated, preconfigured policy.

SUMMARY

Conventional authorization systems suffer from a variety of deficiencies. For example, as indicated above, authorization systems utilize predefined policies to determine if a user is allowed to carry out a given operation on a particular resource associated with the data storage system. Typically, a system administrator is responsible for defining the policies for resources on the system based upon user identification or privilege level. As new resources are added to the system or as existing resources within the system are modified, the system administrators are required to add new policies or update existing policies associated with the system to ensure that the resources are adequately protected. For a large collection of resources, such updating can be time consuming and error-prone.

By contrast to conventional authorization systems, embodiments of the invention relate to system authorization based upon access characteristics associated with a system resource. An authorization device is configured to provide or deny a user's access to a resource on a data system based upon an access characteristic associated with the resource. When the authorization device receives an authorization request to authorize a user to perform an operation on a data system resource, the authorization device retrieves the access characteristic associated with the resource and compares the access characteristic with an access control policy associated with the request. Based upon the comparison, the authorization device carries out the requirements of the policy, such as to either allow or deny the request. The use of the access characteristic as the basis for authorization allows the authorization device to dynamically adapt to changes within the data system. For example, in response to a new resource being added to the system or to an existing resource within the system being modified, the data system can change the access characteristics for the resources to correspond to any change in an access status (e.g., secrecy level document classification) of the resource used in comparison against the policy. Such dynamic adaptation minimizes the time required by systems administrators to police changes in the resources and to write or revise policies associated with the resources. Additionally, the dynamic adaptation provides the data system with a level of scalability for managing the access control policies for a relatively large collection of resources.

The access characteristic associated with a resource can be based upon a variety of factors. In one arrangement, the access characteristic associated with a resource is based upon a content sensitivity classification of the resource. For example, certain resources, such as documents, can include personally identifiable information (PII), such as a social security number or a credit card number. Based upon the inclusion of PII within a document, the data system can assign the document a sensitivity code to allow certain users, and exclude certain users, from accessing the document. In another arrangement, the access characteristic associated with a resource is based upon a model of access patterns for a given resource. For example, the authorization device is configured with a model of normal or standard access behavior exhibited by a typical user when accessing a particular resource. In the case where the authorization device detects access behavior that falls outside of the model for normal of standard behavior, the authorization device can deny the requesting user from accessing the resource.

In one arrangement, an authorization device is configured to authorize access to a resource. The authorization device receives an authorization request to authorize a client device to perform an operation on the resource associated with a data system and compare an access characteristic associated with the resource with a policy associated with the resource. The authorization device generates a first message when a result of the comparison indicates that the client device is authorized to perform the operation on the resource and generates a second message when a result of the comparison indicates that the client device is unauthorized to perform the operation on the resource.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention relate to system authorization based upon access characteristics associated with a system resource. An authorization device is configured to provide or deny a user's access to a resource on a data system based upon an access characteristic associated with the resource. When the authorization device receives an authorization request to authorize a user to perform an operation on a data system resource, the authorization device retrieves the access characteristic associated with the resource and compares the access characteristic with an access control policy associated with the request. Based upon the comparison, the authorization device carries out the requirements of the policy, such as to either allow or deny the request. The use of the access characteristic as the basis for authorization allows the authorization device to dynamically adapt to changes within the data system. For example, in response to a new resource being added to the system or to an existing resource within the system being modified, the data system can change the access characteristics for the resources to correspond to any change in an access status (e.g., secrecy level document classification) of the resource used in comparison against the policy. Such dynamic adaptation minimizes the time required by systems administrators to police changes in the resources and to write or revise policies associated with the resources. Additionally, the dynamic adaptation provides the data system with a level of scalability for managing the access control policies for a relatively large collection of resources.

Figure 1:
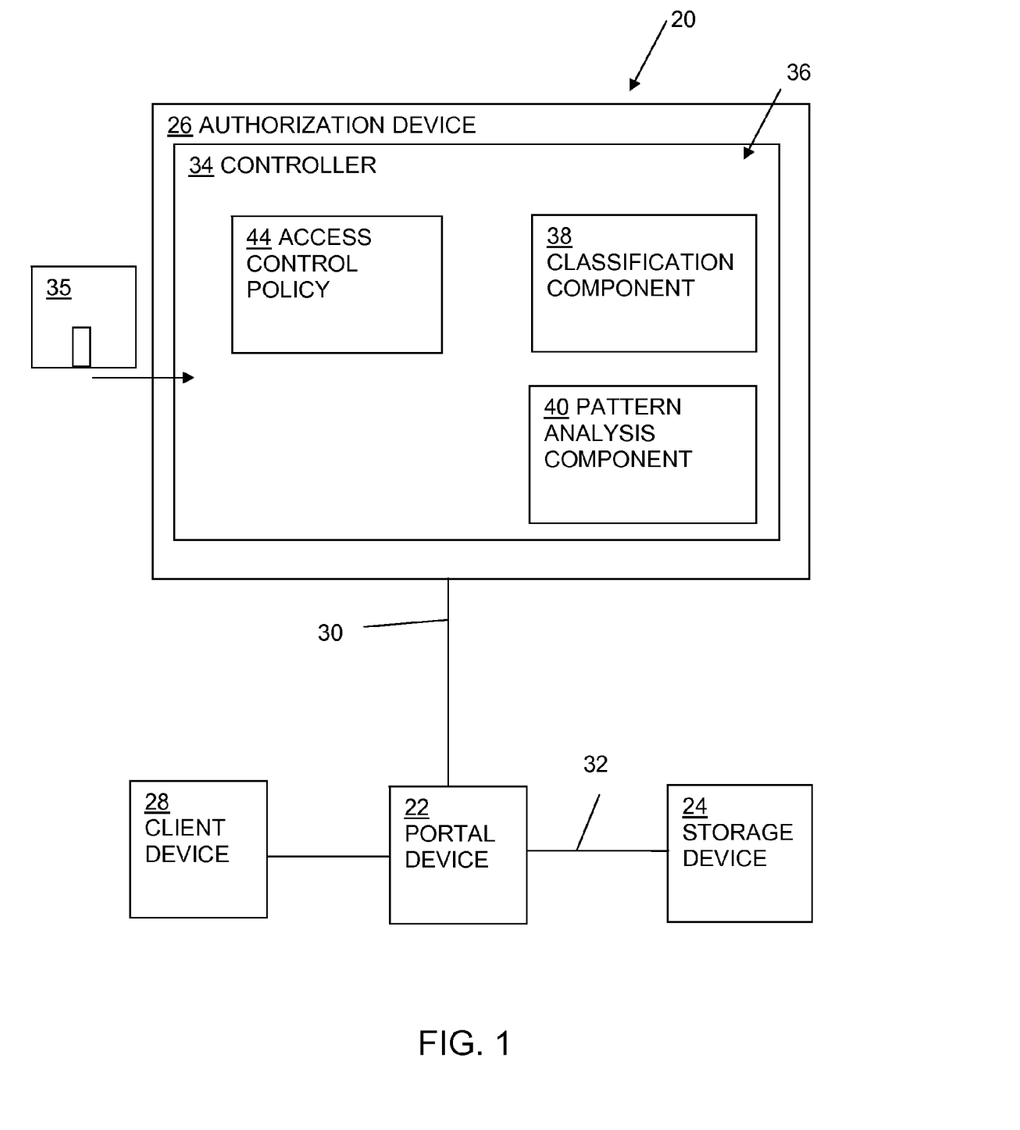
FIG. 1 illustrates a schematic representation of a data system having an authorization device.

FIG. 1 illustrates an example arrangement of a data system 20. In one arrangement, the data system 20 is configured as a local area network (LAN) within an organization that provides client device access to resources, such as electronic documents or electronic mail, within the data system 20. As illustrated, the data system 20 includes a portal device 22, a storage device 24, and an authorization device 26.

In the data system 20, the portal device 22 is in electrical communication with the authorization device 26 and the storage device 24. For example, in the case where the data system 20 is configured as a LAN, the portal device is electrically coupled to the storage device 24 and the authorization device 26 via cables 30, 32. The portal device 22 is configured as a gateway for one or more client devices 28 to gain access to the resources contained by the data system 20, such as documents stored on storage device 24. For example, in response to a request from the client device 28, the portal device 22, operating in conjunction with the authorization device 26, can perform an operation, such as either allow or deny the client device 28 access to the storage device 24 or to other resources associated with the data system 20. While the portal device 22 can have a variety of configurations, in on arrangement, the portal device 22 is configured as a computerized device, such as a gateway or a hub.

The storage device 24, in one arrangement, is configured as a set of disk enclosures where each of the disk enclosures includes an array of magnetic memory units or disk drives. The storage device also includes one or more storage processors configured to perform load and store operations on the disk drives on behalf of the client device 28, for example. In one arrangement, the storage device 24 stores certain resources, such as documents.

The authorization device 26 is configured to provide or deny the client device 28 with access to a resource on the data system 20 based upon an access characteristic associated with the resource. The authorization device 26, such as a computerized device, includes a controller 34, such as a memory and a processor. In one arrangement, the controller 34 stores a system authorization application. The system authorization application installs on the authorization device 26 from a computer program product 35. In some arrangements, the computer program product 35 is available in a standard off-the-shelf form such as a shrink wrap package (e.g., CD-ROMs, diskettes, tapes, etc.). In other arrangements, the computer program product 35 is available in a different form, such as downloadable online media. When performed on the controller 34 of the authorization device 26, the system authorization application causes the authorization device 26 to authorize access of the client device 28 to a data system resource.

As illustrated in FIG. 1, the authorization device 26 includes an access characteristic component 36 and a set of access control policies 44. As will be described in detail below, the authorization device 26 is configured to utilize the access control policies 44 in conjunction with the access characteristic component 36 to either allow or deny the client device 28 access to the resources of the data system 20.

The access characteristic component 36 is configured to associate certain adaptive or dynamically changing factors with the resources of the data system 20. As the adaptive factors of a resource change during operation of the data system 20, the accessibility of the resource to a user or client device can change as well. By associating the adaptive factors to the resources, as the adaptive factors associated with the resources change, the access characteristic component 36 allows the authorization device 26, in turn, to adapt to any changes to the resources within the data system 20 and either allow or deny the client device 28 access to the resources based upon the changes.

While the access characteristic component 36 can be configured in a variety of ways, in one arrangement, the access characteristic component 36 includes a classification component 38 and a pattern analysis component 40.

The access classification component 38 is configured to provide the resources within the data system 20 with an associated classification characteristic that identifies a privacy grade of the resource. For example, assume the data system 20 stores a set of documents on the storage device 24. During an initial configuration stage, the classification component 38 scans each of the documents for PII and based upon the inclusion or exclusion of the PII, assigns each document its own privacy grade. In one arrangement, in the case where the classification component 38 detects the document as including an employee social security number and an employee address (i.e., PII), the classification component 38 assigns the document with a relatively high privacy grade, indicating the document is sensitive and not intended for open or widespread access within the system 20. Alternately, in the case where the classification component 38 detects the document as lacking PII, the classification component can assign the document with a relatively low privacy grade, indicating the document is intended for open access within the system 20.

After the initial configuration stage, the classification component 38 is also configured to dynamically update the classification characteristics of the resources, based upon some triggering event, to ensure that the sensitivity grade assigned to a particular resource is accurate. In one arrangement, the classification component 38 scans and reclassifies a resource on the data system 20 after a triggering event. For example, the classification component 38 can automatically scan all of the resources on the data system after the passage of a certain amount of time (i.e., the scans occur once a week) and assigns each resource its own privacy grade. In another example, the classification component 38 scans a resource when the resource, such as a document, is added to the data system 20 (e.g., new employee data containing PII content is added to the data system 20), when an resource is modified (e.g., PII information is added to an existing document), or when dynamic content is generated (e.g., when dynamic web pages are generated on-the-fly per incoming requests).

By providing access control based upon the sensitivity grade assigned to a particular resource, the authorization device 26 minimizes cases where unauthorized users can gain access to sensitive or classified information. Additionally, because the classification component 38 is configured to periodically adjust the privacy grade of a particular resource, a systems administrator is not required to modify the access control policies 44 for the resource to account for any changes in the classification of the resource.

As indicated above, the authorization device 26 also includes the pattern analysis component 40 which is configured to detect normal and abnormal access patterns of the data system resources based on a variety of identification factors. In one arrangement, during an initial configuration stage, the pattern analysis component 40 monitors the data system resources and builds access behavior profiles for the data system resources based on several identification factors. For example, as client devices 28 access resources in the data system, such access includes several factors relating to how the resource is being accessed. As a client device 28 transmits an access request to the data system 20, the access request includes factors relating to the identity of the requesting user (e.g., name), a location of the requesting user (e.g., source address), an identity of the requesting device, the type of resource being accessed, and a time at which the request was transmitted, for example. The pattern analysis component 40, configured with an initial behavior model, monitors the identification factors to build an access behavior profile based on the behavior model (i.e., a normal or typical behavior profile) related to a particular resource. For example, by monitoring the data system 20, the pattern analysis component can build an access behavior profile, based upon an initial model for financial documents in the data system 20 by detecting that client devices located in the human resources department typically access the financial documents between 8 AM and 5 PM. Once the pattern analysis component 40 has developed one or more access behavior profile, the pattern analysis component 40 continues to monitor the data system resources in order to dynamically refine and update the existing access behavior profiles.

As indicated above, the authorization device 26 is configured to utilize the access control policies 44 in conjunction with the access characteristic component 36 to either allow or deny the client device 28 access to the resources of the data system 20. The set of access control policies 44, in one arrangement, are preconfigured by a system administrator. In one arrangement, when setting the policies 40 for the data system 20, the system administrator defines a user population on the data system 20, the resources contained on the data system 20, and the relationships between them, as dictated by the access classification component 36. For example, the system administrator can define a policy that indicates only a human resource staff member can access documents having a high privacy grade.

Figure 2:
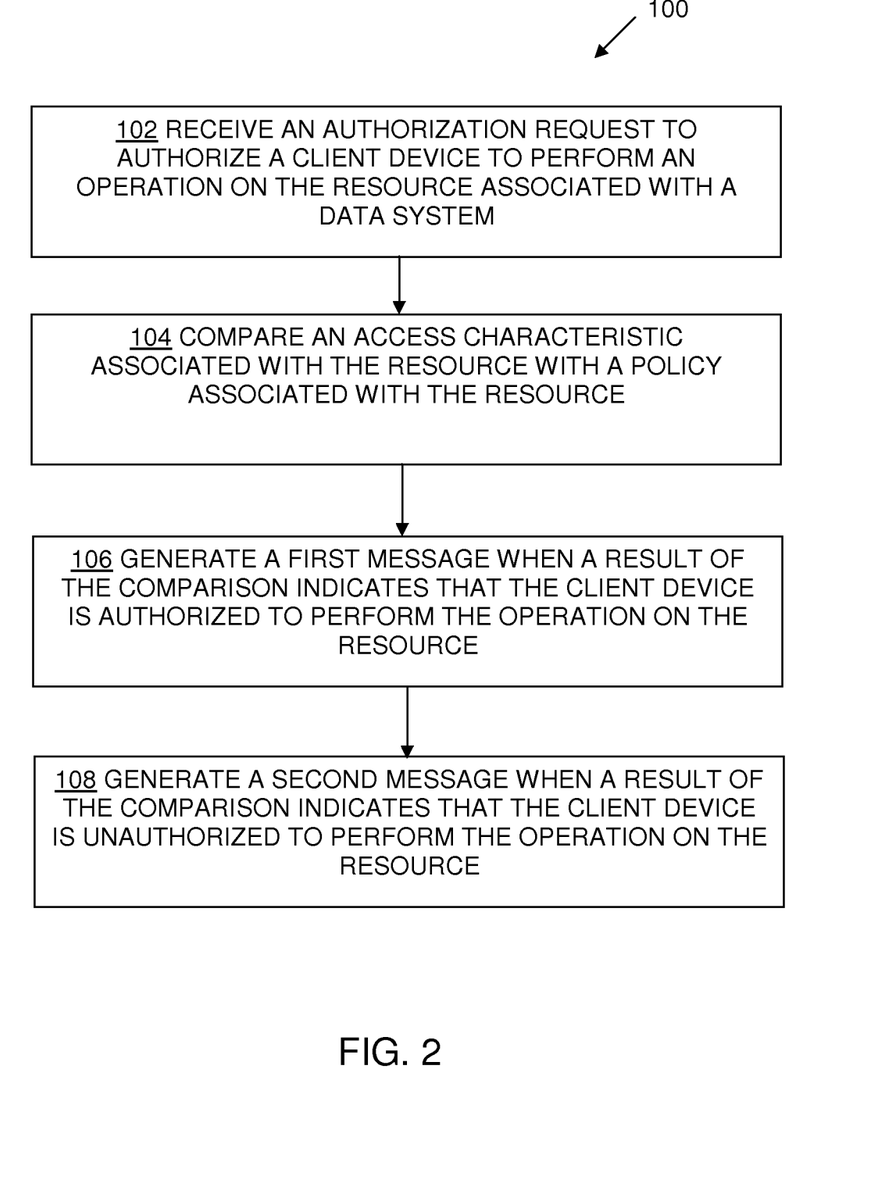
FIG. 2 is a flowchart that illustrates a procedure performed by the authorization device of FIG. 1.

FIG. 2 is a flowchart that illustrates an example procedure 100 performed by the authorization device 26 to authorize a client device's 28 access to a resource on the data system 20. In the procedure, the authorization device 26 utilizes both the access control policies 44 and the access characteristic components 36 to either allow or deny user access to the resource.

In step 102, the authorization device 26 receives an authorization request to authorize a client device 28 to perform an operation on the resource associated with a data system 20. For example, with reference to FIG. 3, in order to perform an operation on a resource on the data system 20, such as to access a document, the client device 28 transmits a request 50 to the data system 20 via communications connection 52. The portal device 22 intercepts the request 50 on behalf of the data system 20 and in response transmits an authorization request 54 to the authorization device 26. While the authorization request 54 can have a variety of configurations, in one arrangement, the authorization request 54 includes a set of identification factors 56, such as a client device name, a client device network address, and a time associated with the request, as well as a resource identifier 58 which identifies a document being requested. For example, assume that the identification factors 56 indicate the client device 28 originating the request belongs to a human resources group of an organization with the request being generated at 3 AM. Furthermore, assume the document identifier 58 indicates the client device 28 is requesting a financial document.

Figure 3:
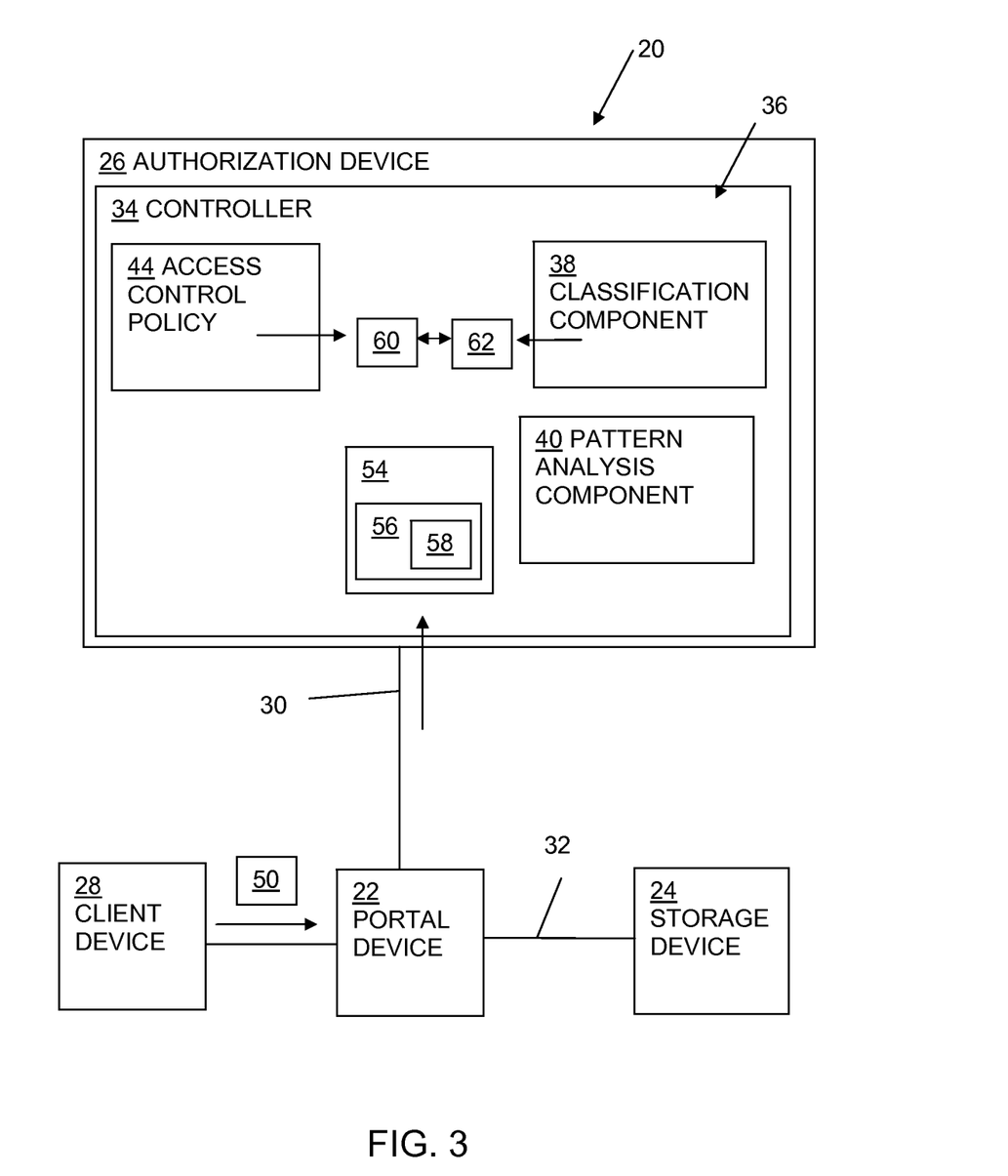
FIG. 3 illustrates a schematic representation of the data system of FIG. 1 showing operation of a classification component of the authorization device.

Returning to FIG. 2, in step 104, the authorization device 26 compares an access characteristic 62 associated with the resource with a policy 60 associated with the resource. As indicated in FIG. 3, as the authorization device 26 receives the authorization request 54, the authorization device 26 detects, from the authorization request 54, the resource being requested. For example, based upon the document identifier 58, the authorization device 26 detects the client device 28 as requesting a financial document. Accordingly, the authorization device 26 retrieves the access control policy 60 associated with the financial document from the access control policy 44. For example, assume the authorization device retrieves the access control policy 60 associated with the financial document which indicates that for the financial document, only a user from the human resource group can access the document if the document has classification characteristic 62 indicating a relatively high privacy grade. The authorization device 26 also retrieves a classification characteristic 62 associated with the document from the classification component 38 where the classification characteristic 62 identifies the privacy grade of the document. For example, assume that the classification characteristic 62 identifies the document as having a relatively high privacy grade.

After having retrieved the access control policy 60 and the classification characteristic 62 associated with the document, the authorization device 26 compares the classification characteristic 62 with the policy 60 associated with the document. In one arrangement, in the comparison, the authorization device 26 correlates the policy 60 with the classification characteristic 62 to allow the authorization request 54. In the present example, because the policy 60 indicates that for the financial document, only a user from the human resource group can access the document if the document has a relatively high privacy grade and because the classification characteristic 62 indicates the document has a relatively high privacy grade, correlation of the policy 60 and the classification characteristic 62 results in the authorization device 26 detecting the client device 28 as being authorized to access the financial document.

Figure 4:
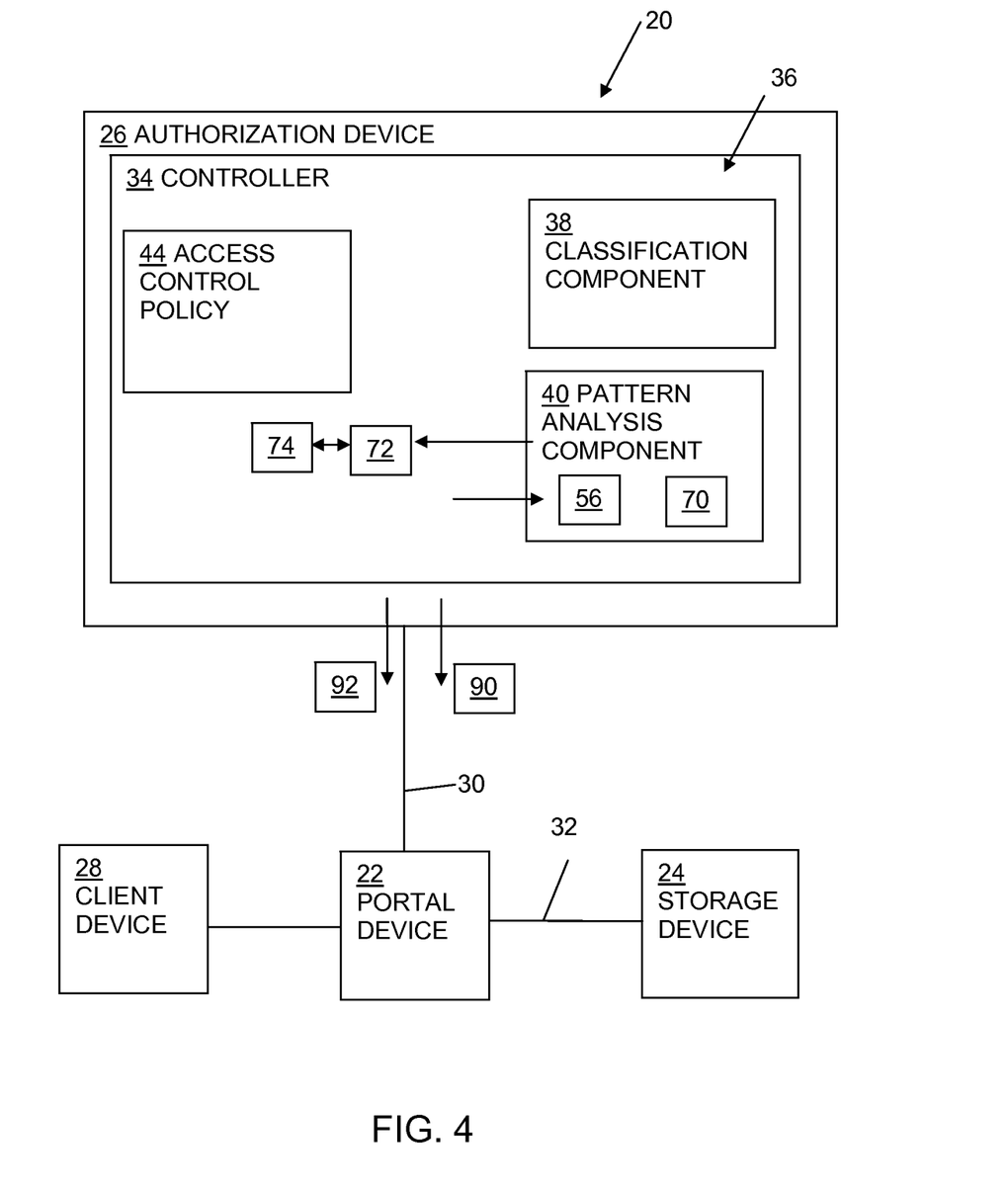
FIG. 4 illustrates a schematic representation of the data system of FIG. 1 showing operation of a pattern analysis component of the authorization device.

In such a case, and with reference to FIG. 4, in the case where the authorization device 26 detects the client device 28 as being authorized to perform the operation on the resource, the authorization device 26 then utilizes the pattern analysis component 40 as part of the authorization process. In one arrangement, the authorization device 26 transmits the identification factors 56 to the pattern analysis component 40. Upon receipt of the identification factors 56, the pattern analysis component 40 compares the identification factors 56 with the statistics built up from previous behavior based on an access behavior profile 70 related to the resource to generate a risk score. For example, assume the access behavior profile 70 indicates that, typically, requests for the financial document request originate from a computer device in the human resources group, with the requests typically being generated between 9 AM and 3 PM. In this case, when the pattern analysis component 40 compares the access behavior profile 70 with the identification factors 56 (i.e., client device 28 originating the request belongs to a human resources group of an organization with the request being generated at 3 AM), the pattern analysis component 40 detects that the time of the request deviates from that of the access behavior profile 70. As a result, the pattern analysis component 40 generates a risk score 72 associated with the client device 28 request indicating a relative level of risk associated with authorizing the client device request and forwards the risk score 72 to the authorization device 26, based upon such deviation. The authorization device 26 then compares the received risk score 72 with a threshold risk score 74 of the policy 60 associated with the resource.

In one case, when the comparison of the generated risk score 72 and the threshold risk score 74 indicates a first, lower risk level associated with the request, thereby indicating that the client device 28 is authorized to perform the operation on the resource, the authorization device 26 proceeds to step 106 and generates a first message 90, such as a message that instructs the portal device 22 to carry out a first action specified by the policy. For example, assume the case where the risk score 72 has a relatively low value relative to the threshold risk score 74. Based upon a comparison of the scores 72, 74, the authorization device 26 detects the client device 28 as being authorized to perform the operation on the resource and generates the first message 90. In response to receiving the first message 90 from the authorization device 26, the portal device 22 grants the client device access to the requested resource, such as the financial document.

In another case, when the comparison of the generated risk score 72 and the threshold risk score 74 indicates a second, higher risk level associated with the request, thereby indicating that the client device 28 is not authorized to perform the operation on the resource, the authorization device 26 proceeds to step 108 and generates a second message 92, such as a message that instructs the portal device 22 to carry out a second action specified by the policy. For example, assume the case where the risk score 72 has a relatively high value relative to the threshold risk score 74. Based upon a comparison of the scores 72, 74, even though the policy 60 allows the client device 28 to access the requested resource, because of the relatively abnormal pattern indicated by the identification factors 56, the authorization device 26 detects the client device 28 as being unauthorized to perform the operation on the resource generates the second message 92. In response to receiving the second message 92 from the authorization device 26, the portal device 22 can deny the client device 28 access to the requested resource, such as the financial document, trigger authentication of the client device 28, and/or log the client device request in a log file (i.e., as specified by the policy).

By basing authorization of a request to perform an operation on a resource on dynamically updated authorization characteristics, such as a classification characteristic 68 and an access behavior profile 70, the authorization device 26 minimizes the time required by systems administrators to police changes in the resources and to write or revise policies associated with the resources. Additionally, the combination of the classification component and the pattern analysis component provides the data system 20 with a level of scalability for managing the access control policies for a relatively large collection of resources.

While various embodiments of the invention have been particularly shown and described, it will be understood by those skilled in the art that various changes in form and details may be made therein without departing from the spirit and scope of the invention as defined by the appended claims.

For example, the authorization device 26 was described as using both the classification component 38 and the pattern analysis component 40 in order to either grant or deny a client device 28 access to a requested resource. Such description was by way of example only. In one arrangement, the authorization device 26 is configured to utilize either the classification component 38 or the pattern analysis component 40 to authorize a client device 28 to perform an operation on a requested resource.

In another example, as indicated above, the pattern analysis component 40 is configured to monitor resources in the data system 20 in order to dynamically refine and update its existing access behavior profiles 70. In one arrangement, the authorization device 26 works in conjunction with the pattern analysis component 40 to update the access behavior profiles 70. For example, when the authorization device 26 transmits the identification factors 56 to the pattern analysis component 40, such transmission dynamically update the risk profile 70 associated with the pattern analysis component 40.

In the above example, when the pattern analysis component 40 compares the access behavior profile 70 with the identification factors 56 (i.e., client device 28 originating the request belongs to a human resources group of an organization with the request being generated at 3 AM), the pattern analysis component 40 detected that the time of the request deviates from that of the access behavior profile 70. However, other identification factors 56 can trigger the pattern analysis component 40 to detect a deviation in behavior (i.e., abnormal behavior). In one arrangement, the pattern analysis component 40 can detect a user as exhibiting a pattern of behavior towards sensitive resources that is distinct from other users of the same category. For example, the pattern analysis component 40 can detect unusual behavior when a single engineer from a group of engineers in the same department attempts to access sensitive resources multiple times in a relatively short period of time. In another arrangement, the pattern analysis component 40 can detect abnormal behavior on certain resource when based upon unusual access patterns for certain document from a collection of resources with the same level of sensitivity. For example, the pattern analysis component 40 can detect unusual behavior when multiple users are accessing the same sensitive resource differently to other, related, resources.

What is claimed is:

1. In an authorization device, a method for authenticating access to a resource, comprising:
   receiving, by an authorization device, an authorization request to authorize a client device to perform an operation on the resource associated with a data system;
   comparing, by the authorization device, an access characteristic associated with the resource with a policy associated with the resource;
   testing, when a result of comparing indicates that the client device is authorized to perform the operation on the resource, whether a risk score associated with the client device performing the operation on the resource exceeds a predetermined risk threshold associated with a policy of the resource;
   generating, by the authorization device, a first message when both the result of comparing indicates that the client device is authorized to perform the operation on the resource and the testing indicates that the risk score does not exceed the predetermined risk threshold; and generating, by the authorization device, a second message when the result of the comparison indicates that the client device is unauthorized to perform the operation on the resource, wherein comparing, by the authorization device, the access characteristic associated with the resource with the policy associated with the resource comprises:

retrieving, by the authorization device, a classification characteristic associated with the resource from a classification component, the classification component configured to dynamically update the classification characteristic of the resource, the classification characteristic identifying a privacy grade of the resource; and comparing, by the authorization device, the classification characteristic with the policy associated with the resource, wherein testing whether the risk score associated with the client device performing the operation on the resource exceeds the predetermined risk threshold includes:

transmitting, by the authorization device, a set of identification factors associated with the request to a pattern analysis component, the pattern analysis component configured with an access behavior profile related to the resource;

receiving, by the authorization device, the risk score from the pattern analysis component, the risk score resulting from a comparison of the access behavior profile associated with the resource and the set of identification factors associated with the request, the risk score indicating a risk level associated with the request; and comparing, by the authorization device, the received risk score with the threshold risk score of the policy associated with the resource, a result of the comparison indicating that the client device is authorized to perform the operation on the resource when the comparison of the generated risk score with a threshold risk score of the policy associated with the resource indicates a first risk level associated with the request and a result of the comparison indicating that the client device is unauthorized to perform the operation on the resource when the comparison of the generated risk score with a threshold risk score of the policy associated with the resource indicates a second risk level associated with the request, the second risk level being greater than the first risk level, and wherein transmitting, by the authorization device, the set of identification factors associated with the request to the pattern analysis component comprises transmitting, by the authorization device, the set of identification factors associated with the request to the pattern analysis component, the set of identification factors including the classification characteristic identifying a privacy grade of the resource.

2. The method of claim 1, wherein transmitting, by the authorization device, the set of identification factors associated with the request to the pattern analysis component comprising dynamically updating, by the authorization device, the risk profile associated with the pattern analysis component.

3. The method of claim 1, wherein the set of identification factors associated with the request are selected from the group consisting of a client device name, a client device network address, and a time associated with the request.

4. An authorization device of a data storage system, comprising:

at least one communications interface; and a controller electrically coupled to the at least one communications interface wherein the controller is configured to:

receive an authorization request to authorize a client device to perform an operation on the resource associated with a data system;

compare an access characteristic associated with the resource with a policy associated with the resource;

test, when a result of the comparison indicates that the client device is authorized to perform the operation on the resource, whether a risk score associated with the client device performing the operation on the resource exceeds a predetermined risk threshold associated with a policy of the resource;

generate a first message when both the result of the comparison indicates that the client device is authorized to perform the operation on the resource and the test indicates that the risk score does not exceed the predetermined risk threshold; and generate a second message when a result of the comparison indicates that the client device is unauthorized to perform the operation on the resource, wherein when comparing the access characteristic associated with the resource with the policy associated with the resource, the controller is configured to:

retrieve a classification characteristic associated with the resource from a classification component, the classification component configured to dynamically update the classification characteristic of the resource, the classification characteristic identifying a privacy grade of the resource; and compare the classification characteristic with the policy associated with the resource, wherein when configured to test whether the risk score associated with the client device performing the operation on the resource exceeds the predetermined risk threshold, the controller is further configured to:

transmit a set of identification factors associated with the request to a pattern analysis component, the pattern analysis component configured with an access behavior profile related to the resource;

receive the risk score from the pattern analysis component, the risk score resulting from a comparison of the access behavior profile associated with the resource and the set of identification factors associated with the request, the risk score indicating a risk level associated with the request; and compare the received risk score with the threshold risk score of the policy associated with the resource, a result of the comparison indicating that the client device is authorized to perform the operation on the resource when the comparison of the generated risk score with a threshold risk score of the policy associated with the resource indicates a first risk level associated with the request and a result of the comparison indicating that the client device is unauthorized to perform the operation on the resource when the comparison of the generated risk score with a threshold risk score of the policy associated with the resource indicates a second risk level associated with the request, the second risk level being greater than the first risk level, and wherein when transmitting the set of identification factors associated with the request to the pattern analysis component, the controller is configured to transmit the set of identification factors associated with the request to the pattern analysis component, the set of identification factors including the classification characteristic identifying a privacy grade of the resource.

5. The authorization device of claim 4, wherein when transmitting the set of identification factors associated with the request to the pattern analysis component, the controller is configured to dynamically update the risk profile associated with the pattern analysis component.

6. The authorization device of claim 4, wherein the set of identification factors associated with the request are selected from the group consisting of a client device name, a client device network address, and a time associated with the request.

7. A non-transitory computer program product having a computer-readable medium including computer program logic encoded thereon that, when performed on a controller of an authorization device causes the authorization device to:
   receive an authorization request to authorize a client device to perform an operation on the resource associated with a data system;
   compare an access characteristic associated with the resource with a policy associated with the resource;
   test, when a result of the comparison indicates that the client device is authorized to perform the operation on the resource, whether a risk score associated with the client device performing the operation on the resource exceeds a predetermined risk threshold associated with a policy of the resource;
   generate a first message when both the result of the comparison indicates that the client device is authorized to perform the operation on the resource and the test indicates that the risk score does not exceed the predetermined risk threshold; and
   generate a second message when a result of the comparison indicates that the client device is unauthorized to perform the operation on the resource,
   wherein the computer program product, having the non-transitory computer-readable medium including computer program logic encoded thereon that, when performed on the controller of the authorization device causes the authorization device, when comparing the access characteristic associated with the resource with the policy associated with the resource, to:
   retrieve a classification characteristic associated with the resource from a classification component, the classification component configured to dynamically update the classification characteristic of the resource, the classification characteristic identifying a privacy grade of the resource; and
   compare the classification characteristic with the policy associated with the resource,
   wherein the computer program logic, when performed on the controller of the authorization device causes the authorization device, when comparing the access characteristic associated with the resource with the policy associated with the resource, to:
   transmit a set of identification factors associated with the request to a pattern analysis component, the pattern analysis component configured with an access behavior profile related to the resource;
   receive the risk score from the pattern analysis component, the risk score resulting from a comparison of the access behavior profile associated with the resource and the set of identification factors associated with the request, the risk score indicating a risk level associated with the request; and
   compare the received risk score with the threshold risk score of the policy associated with the resource, a result of the comparison indicating that the client device is authorized to perform the operation on the resource when the comparison of the generated risk score with a threshold risk score of the policy associated with the resource indicates a first risk level associated with the request and a result of the comparison indicating that the client device is unauthorized to perform the operation on the resource when the comparison of the generated risk score with a threshold risk score of the policy associated with the resource indicates a second risk level associated with the request, the second risk level being greater than the first risk level,
   wherein when transmitting the set of identification factors associated with the request to the pattern analysis component, the controller is configured to transmit the set of identification factors associated with the request to the pattern analysis component, the set of identification factors including the classification characteristic identifying a privacy grade of the resource.

8. The method as recited in claim 1, wherein the resource has a relatively high privacy grade if the resource contains sensitive information and the resource has a relatively low privacy grade if the resource does not contain sensitive information.

9. The method as recited in claim 8, further comprising, during an initial configuration stage:
   scanning, by the classification component, documents in the data system for the presence of personally identifiable information (PII);
   classifying documents as having a relatively high privacy grade if the documents contain PII; and
   classifying documents as having a relatively low privacy grade if the documents do not contain PII.

10. The method as recited in claim 8, further comprising:
    scanning the resource to establish the privacy grade of the resource when the resource is added to the data system; and
    reclassifying the privacy grade of the resource when the resource is modified.

11. The method as recited in claim 1, further comprising detecting, by the pattern analysis component, a user exhibiting a pattern of behavior toward resources with relatively high privacy grades that is distinct from behavior of other users in a same category as the user.

12. The method as recited in claim 11, wherein the set of identification factors includes time of day, and wherein the method further comprises detecting, by the pattern analysis component, a deviation in the time of day of the request from the access behavior profile related to the resource.

13. The method as recited in claim 1, further comprising detecting, by the pattern analysis component, abnormal behavior of users on a certain resource relative to other resources having the same privacy grade.

14. The method of claim 1, wherein comparing the classification characteristic identifying the privacy grade of the resource with the policy associated with the resource includes:
    obtaining from the set of identification factors a user group to which a requesting user of the client device belongs and a type of resource being accessed;
    when the privacy grade of the resource is relatively high, operating the policy to authorize the client device to perform the operation on the resource in response to the user being a member of a particular user group; and when the privacy grade of the resource is relatively low, operating the policy to deny the client device to perform the operation on the resource in response to the user not being a member of a particular user group.

15. The method of claim 14, further comprising:

storing the resource in a storage device;

storing the privacy grade for the resource in the authorization device;

directing a portal device to allow the client device to access the storage device via the portal device when the authorization device generates the first message; and directing the portal device to block the client device from accessing the storage device via the portal device when the authorization device generates the second message.

\* \* \* \* \*